United States Patent

[11] 3,556,477

[72] Inventor   Earl O. Schweitzer
                Wickliffe, Ohio
[21] Appl. No.  737,236
[22] Filed      June 14, 1968
[45] Patented   Jan. 19, 1971
[73] Assignee   Clevite Corporation
                a corporation of Ohio

[54] INK FLOW CONTROL MEANS FOR INK PEN RECORDERS
     5 Claims, 5 Drawing Figs.
[52] U.S. Cl. .................................... 251/335, 251/339
[51] Int. Cl. .................................... F16k 41/04
[50] Field of Search ........................... 251/335, 339, Ball valve supp. op.; 346/140(Cursory)

[56]            References Cited
              UNITED STATES PATENTS

| | | | |
|---|---|---|---|
| 951,855 | 3/1910 | Sullivan | 251/335X |
| 2,967,544 | 1/1961 | Pearsall | 137/622 |
| 3,082,783 | 3/1963 | Welty et al. | 251/335X |
| 3,104,676 | 9/1963 | Steer | 251/339X |
| 3,266,048 | 8/1966 | Schweitzer | 346/140 |
| 3,341,860 | 9/1967 | Schweitzer | 346/140 |
| 3,424,429 | 1/1969 | Monnich | 251/335X |

Primary Examiner—Samuel Scott
Attorney—Eber J. Hyde

ABSTRACT: In an ink pen recorder system, the ink flow control means is provided with a unique valving means so that, when the ink pen recorder system is turned off, a sufficient quantity of ink is withdrawn from the pen tip to prevent smudging. Likewise, when the system is turned on, a quantity of ink is made available at the pen tip to insure nearly instantaneous ink flow at the pen tip.

PATENTED JAN 19 1971
3,556,477
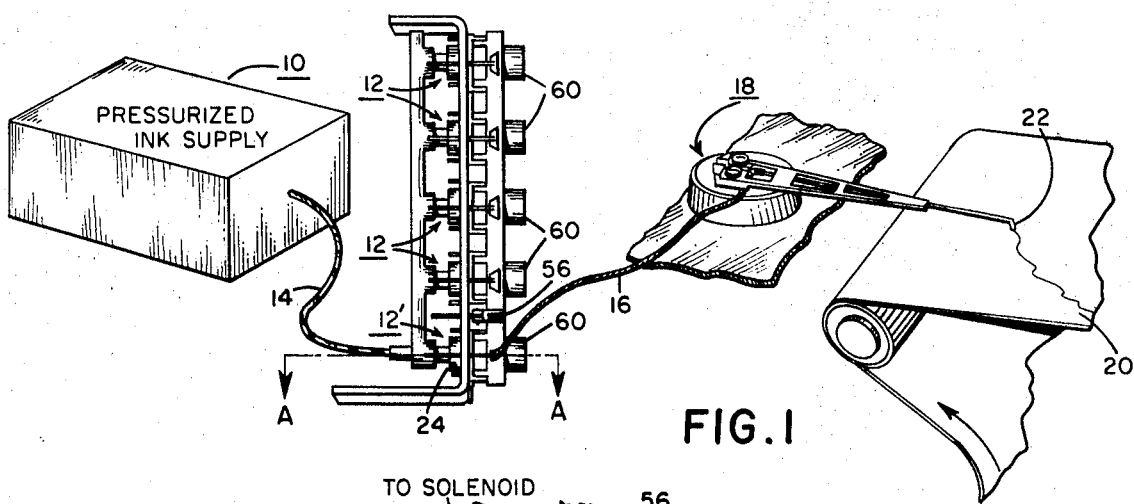
FIG.1
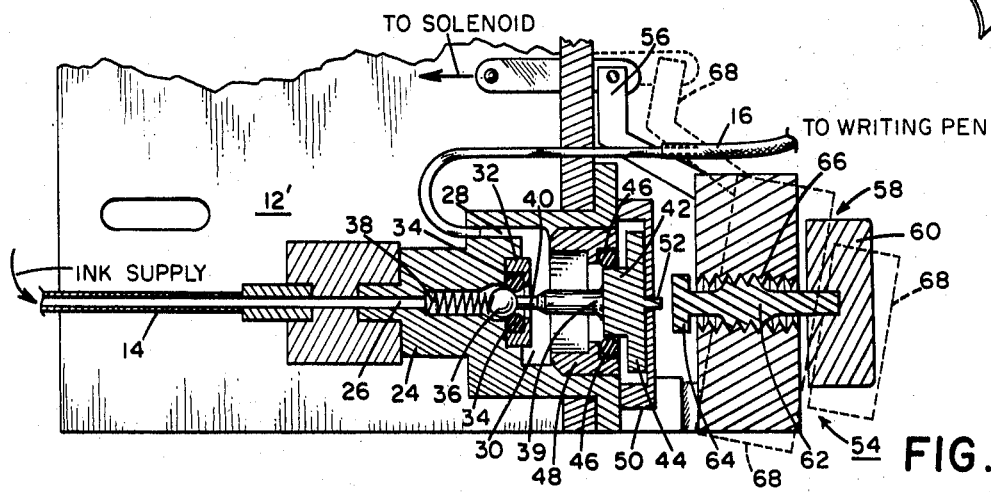
FIG.2
FIG.4
FIG.3
FIG.5
INVENTOR.
EARL O. SCHWEITZER
BY
*Eber J. Hyde*
ATTORNEY 3,556,477

INK FLOW CONTROL MEANS FOR INK PEN RECORDERS

BACKGROUND OF THE INVENTION

1. Field of the Invention

This invention relates to an improved pressure ink supply system for an ink pen recorder. More particularly, the present invention contemplates certain improvements for the ink flow control means which controls the flow of ink to the pen tip of an ink pen recorder system.

Present-day ink pen recorders generally can be separated into three component parts, as follows:
1. a pressurized ink supply;
2. an ink flow control means which controls the ink flow from the ink supply; and
3. an ink pen in combination with a movable record medium upon which the ink is applied. The present invention relates to the second component, i.e., the ink flow control means.

2. Description of the Prior Art

As is known to those skilled in the art, the solution to the problem of instantaneously terminating the flow of ink at the pen tip has been the object of many inking systems. Inking systems have been disclosed which are advantageously independent of gravitational and acceleration forces, temperature and altitude effects and substantially eliminate drying and clogging of the ink within the pen. However, even though these systems have resulted in substantial advances in the recording art, they still have been found to be subject to a major objectionable characteristic. Namely, even after the closure of the ink flow control means, a remanent pressure exists between the ink flow control means and the pen which causes ink to be discharged from the pen tip when the pen is lifted for servicing, etc.

Furthermore in a multipen recorder having a single ink manifold connected to supply a plurality of pens, the tendency is for one pen, when removed from contact with the record medium, to act as a vent for the manifold resulting in ink leakage from the other pens under the influence of gravity even in the absence of the remanent pressure condition. Such objectionable characteristics have been found to render pen servicing and replacement of the record medium difficult.

An object of the present invention is to provide an improved pressured ink writing system for a recorder.

A further object of the present invention is to provide an improved ink flow control means.

A still further object of the present invention is to provide an improved ink flow control means such that, upon turning the ink pen recorder on, a small quantity of ink is injected into the pen tube to get the writing operation started.

A further object of the present invention is to provide an improved ink flow control means such that, upon turning the ink pen recorder off, a small quantity of ink is withdrawn from the pen tube and therefore avoiding the ink from being discharged onto the record medium after the pen recorder is turned off.

SUMMARY OF THE INVENTION

Briefly, in accordance with the present invention, in an ink pen recorder having a source of ink under pressure and a writing pen in combination with a movable record medium for providing a visible trace on said record medium, an ink flow control means is provided with a valve body means having inlet and outlet passages for connection to the source of ink and the writing pen respectively and having a chamber portion. A valving means is mounted within the chamber portion of the valve body to control the flow of ink through the valve body. The valving means when changing from the open to the closed position varies the volume of the chamber to cause a change in pressure and to thereby cause a volume of ink to flow from the outlet passage into the chamber, or when changing from closed to open causing ink to flow from the chamber into the outlet passage.

BRIEF DESCRIPTION OF THE DRAWING

Further objects and advantages of the invention will appear from the following detailed description to be read in conjunction with the accompanying drawing wherein like reference symbols denote corresponding parts throughout several views.

In the drawing:

FIG. 1 is an elevational view of an ink pen recording system embodying the ink flow control means of the present invention;

FIG. 2 is a sectioned view of the ink flow control means along section lines A-A of FIG. 1 showing the internal parts to the ink flow control means in the closed position;

FIG. 3 is the same view as in FIG. 2 with the ink flow control means in the open position;

FIG. 4 is a diagrammatic representation of the operation of the present invention; and FIG. 5 is a further embodiment of the present invention in cross section to illustrate its internal operations.

DESCRIPTION OF THE PREFERRED EMBODIMENT

While the description of the present invention is directed to ink pen recorder systems, the present invention is applicable to various devices where it is desirable to control the flow of a fluid.

Referring to FIG. 1 of the drawing, there is shown the general components of ink pen recorder system embodying the present invention. A pressure ink supply 10 is shown in block diagram form since these are well known in the art. In general, the supply 10 can be a can containing ink maintained under pressure by gas therein or maintained under pressure by a pump or spring-loaded piston. The ink supply 10 is connected to a series of ink flow control means 12 by a flexible conduit or tube 14. Suitable fittings are provided as shown to facilitate the tubing connections. A series of ink flow control means 12 is shown to illustrate the present invention which provides for one ink flow control means 12 or each pen, As shown in FIG. 1, only the lower ink flow control means 12' is connected by a flexible conduit or tube 16 to a writing pen 18. Suitable fittings are provided as shown to facilitate the tubing connections. For exemplary purposes a high-speed oscillographic writing pen 18, which is well-known in the art, is shown having a movable record medium or strip chart 20 adapted to be engaged and marked by the pen tip 22. In actual practice, a series of writing pens would be connected to the remaining ink flow control means 12 and, in turn, be adapted to engaged the movable record medium 20.

Referring now to FIG. 2 of the drawing which is a section view along the section line A-A of ink flow control means 12' depicted in FIG. 1, there is shown a valve body 24 having an inlet and outlet passages 26 and 28 having a connecting passage or chamber 30. Ink flowing from the ink supply 10 must flow (in sequence) through conduit 14, inlet passage 26, chamber 30, outlet passage 28, and conduit 16 to reach the writing pen 18. The chamber 30 is provided with a suitable shoulder insert 32 for supporting a valve seat 34 such as an O-ring adapted to be engaged by a ball valve member 36 in the closed position of the latter and as shown in FIG. 2. Ball valve member 36 is biased toward engagement with valve seat 34 by means of a coil spring 38 mounted in compression between ball valve member 36 and the valve body 24. When ball valve member 36 is displaced to the left, out of engagement with valve seat 34 (see FIG. 3), communication will be established between ink supply 10 and chamber 30 to the downstream side of valve 34, 36. On the other hand, engagement of the ball valve member with valve seal 34 will terminate communication.

In accordance with the present invention as shown in FIGS. 3 and 4, a unique valve actuating member 39 is provided to displace the ball valve member 36 out of engagement with the valve seat 34. The valve actuating member 39 have an internal stem portion 40 adapted to engage the ball valve member 36, an enlarged middle portion 42 (the function of which will be explained later), and an external portion 44. The valve actuating member 39 is held by sliding seal means 46 such as an O-ring which provides a seal to keep the ink in chamber 30 from leaking out to the external portion 44 of valve actuating member 39 which is external from chamber 30. The chamber 30 is provided with a suitable shoulder 48 for supporting sliding seal means 46 which is adapted to engage the enlarged middle portion 42 of valve actuating member 39. The valve member 39 is also held in position by bracket 50 which provides for a passageway for a projection 52 of the external portion 44 of the valve actuating member 39.

The internal portion of 40 of the valve actuating member 39 is surrounded by valve seat 34 and forms a constriction 49 to the ink flow through the ink flow control means 12. The constriction 49 is large enough to allow the flow of ink during the open position (ball valve member 36 unseated) but small enough to provide an effective restriction when there is fast movement by the internal portion 40 of valve actuating member 39.

An actuating means 54 when in engagement with projection 52 provides the external force necessary, when transmitted through valve actuating member 39, to unseat the ball valve member 36. The actuating means 54 is operated by an electric solenoid (not shown) having a movable core adapted to be displaced to the left as viewed in FIG. 2 upon energization of the solenoid. Motion is transmitted form the solenoid core by means of actuating arm connection 56 which moves the actuating means 54 into contact with the projection 52 to unseat ball valve member 36.

As shown in FIG. 2 and in accordance with the present invention, the present embodiment has an adjustable portion 58 of the actuating means 54. The adjustable portion 58 comprises an on-off knob 60 which is attached to a screw threaded member 62 which has a contact portion 64 which engages the projection 52 of the valve actuating member 39. The screw threaded member 62 engages the threaded portion of body portion 66 of the actuating means 54 which allows the screw threaded member 62 to be moved to the left or right as shown in FIG. 2. When the screw threaded member 62 is moved to the right as shown in FIG. 2, the contact portion 64 cannot contact the projection 52 which holds the ink flow control means 12' in the "off" position when the solenoid is energized. On the other hand, when the screw threaded member 62 is threaded completely to the left, the contact portion 64 can contact the projection 52 when the solenoid is energized (as shown in FIG. 3). This feature of the present invention allows each of the flow control means to be turned on or off individually by means of a simple on-off knob 60.

In operation of the structure disclosed in FIGS. 2 and 3, the parts will assume the positions shown when the solenoid is not energized as shown in FIG. 2, i.e., when the ink flow control means 12' is in the "off" opposition. When the solenoid is not energized the actuating means 54 is in the position indicated by the dotted lines 68. Upon energization of the solenoid, the actuating means 54 is pulled to the left as indicated by the arrows in FIG. 2 which causes contact portion 64 to be brought into contact with projection 52 if the on-off knob 60 is in the "on" position and to displace valve actuating member 39 to the left as shown in FIG. 3 and to thereby displace ball valve member 36. This operation is best illustrated by the diagrammatic representation as shown in FIG. 4. When the system has been in the "off" position and is turned "on," the valve actuating member 39 is moved by fast action to the left (as shown in FIG. 4) and assumes the position shown by the dotted lines. A relatively smaller volume of the valve actuating member 39, represented by number 70, is moved out of the chamber 30. Since the valve actuating member 39 is moved rapidly, and the constriction 49 of the valve seat 34 around the internal end 40 is of such a dimension to provide an effective restriction of the ink flow practically no ink can flow to or from chamber 30. Thus, the volume of ink in chamber 30 is substantially fixed. When the relatively large volume 72 of the enlarged portion 42 advances into chamber 30, the effective volume of the chamber 30 is decreased. This causes a pressure to be built up in the ink and the only exit is through outlet 28 and conduit 16. This results in a nearly instantaneous injection of ink to the pen tip 22 at the time the system is turned on.

On the other hand, when the system is turned off, the valve actuating member 39 returns from the dotted line position to the rest position. In this operation, the relatively larger volume 72 caused by the movement of the enlarged portion 42 to the right, is removed from the chamber 30. The relatively smaller volume 70, created by the movement of the internal portion 40, is brought into the chamber 30. Since this is a fast action of the valve actuating member 39, the constriction of the valve seat 34 around the internal portion 40 of the valve actuating member 39 forms an effective restriction of ink flow. Thus, the effective volume of the chamber 30 is suddenly increased which causes a decrease in pressure and which nearly instantaneously pulls a volume of ink back into the chamber 30 from the conduit 16. This, in turn, nearly instantaneously pulls back a quantity of ink at the pen tip 22 and prevents smudging.

Briefly reviewing this unique operation, the present invention allows the valve actuating member 39 to be displaced only a very short distance yet has the effect of stopping the ink flow at the pen tip 22, thereby eliminating smudging on the record medium 20. In operation, when the valve actuating member 39 is in the "on" position, the ball valve member 36 is off the valve seat 34. The constriction of the valve actuating 34 around the internal portion 40 of the valve member 39 is such that it is large enough to allow the flow of ink during normal operation; however, it is small enough to provide an effective restriction when there is a fast action of the valve actuating member 39. Thus, as shown in FIG. 4, when the valve actuating member 39 returns to its normally closed position, the ink flow is essentially stopped through the constriction 49. The ink in the chamber 30 and the ink that is in the tubing at that time is essentially a constant volume. When the valve actuating member 39 returns to is normally closed position, the difference between the volume of the enlarged portion 42 of the valve actuating member 39 and the volume of the internal portion 40 that is brought back into the chamber 30 represents the available volume for ink occupation. Thus, when the ink supply is turned off, a partial vacuum is created within the chamber. The ink cannot flow back through the constriction 49. Therefore a volume of ink is sucked back from the pen tip 22. It has been found in accordance with the present invention, that by proper sizing of the chamber 30 and the valve actuating member 39, a movement of only 0.15 of an inch by the valve actuating member 39, allowing .003 of a cc or three microliters of ink to be pulled back from the pen tip 22, is sufficient to stop smudging on the record medium.

On the other hand, when the valve actuating member 39 is turned on, small quantity of ink is forced through the conduit 16 to the pen tip. This allows the pen to get started almost instantaneously. This again is a result of the fact that the ink cannot flow back through the valve seat 34 since the fact-acting valve actuating member 39 makes this constriction 49 not available for ink flow.

As shown in FIG. 5, an alternate embodiment of the present invention is provided. In this embodiment, the actuating means can be the same as in the previous embodiment except that the contact portion 80 is hemispherical in shape. A valve actuating member 82 is positioned within the chamber 84. A diaphragm 86 seals the ink within the chamber 84 and is adapted to receive the contact portion 80 of the actuating means. The internal portion 88 of valve actuating member 82 is adapted to engage ball valve means 90 which is biased by a coil spring 92 and adapted to engage a valve seat 94 in the same manner as the embodiment shown in FIGS. 2 and 3.

In operation the contact portion 80 contacts diaphragm 86 and depresses it until contact is made with the valve actuating member 82 and it is displaced to the left as shown in FIG. 5 to unseat the ball valve means 90 from the valve seat 94. The change in volume of chamber 84 is effected in the same manner as in the previous embodiment; however, in the present embodiment the changes in volume are caused by the inward deformation of the diaphragm 86.

The specific embodiments of the invention which have been illustrated and described in detail are intended by way of example and the scope of the invention is to be determined by the appended claims.

I claim:

1. A multipen ink recorder system having individual flow control means for each pen, each said flow control means comprising:

a valve body means having an inlet passage for fluid ink from a source of fluid ink under pressure and an outlet passage for the fluid ink, said valve body means having a chamber portion connecting said inlet passage and said outlet passage, said chamber having a movable wall portion; and valve means mounted within the inlet passage to said chamber portion of said valve body means for rectilinear motion for selectively opening and closing said inlet passage to said chamber portion to control the flow of fluid ink, said valve means when moving from the open to closed position moving said movable wall portion thereby varying the volume of said chamber to cause a decrease in pressure therein and to thereby cause a volume of fluid ink to flow from said outlet passage into said chamber.

2. A flow control means as set forth in claim 1 wherein said valve means when moving from the closed to open position moves said wall portion thereby to vary the volume of said chamber to cause an increase in pressure therein to cause a volume of fluid ink to flow into said outlet passage from said chamber.

3. A multipen ink recorder system having individual flow control means for each pen, each said flow control means comprising:

a single source of ink under pressure;

a plurality of writing pens, flexible conduit means connecting each of said pens to said source of ink for providing a plurality of visible traces on the record member;

a separate ink flow control means for each writing pen located between said source of ink and each of said plurality of pens;

each of said control means having a valve body means with an inlet passage for the ink from said source of ink and an outlet passage for the ink to the writing pen;

said valve body means having a chamber portion connecting said inlet passage and said outlet passage; and valve means mounted within the inlet passage to said chamber portion of said valve body means for rectilinear motion for selectively opening and closing said inlet passage to said chamber portion to control the flow of ink to the pan, movable wall means forming part of said valve body means, said valve means when moving from the open to closed position varying the volume of said chamber by moving said wall means to cause a decrease in pressure therein and to thereby cause a volume of ink to flow from said conduit connected to said outlet passage into said chamber, the volume of ink being sufficient to withdraw ink from said pen tip to prevent smudging.

4. An ink flow control means as set forth in claim 3, wherein said valve means when moving from the closed to open position moves the wall means to vary the volume of said chamber to cause an increase in pressure therein to cause a volume of ink to flow from said chamber into said conduit connected to said outlet passage.

5. An ink flow control means as set forth in claim 3, wherein said valve means further comprises:

a valve member for rectilinear motion, said valve member having an internal portion within said chamber of said valve body means, said valve member having an external portion extending from said chamber of said valve body means toward said inlet passage a valve seat in said inlet passage supporting said valve member in said chamber and forming a seal around said valve member;

a ball valve means in contact with said internal portion of said valve member;

a coil spring having one end biasing said ball valve means into contact with said valve member, said coil spring having another end biased against said valve body means;

the inlet passage to said valve body having a constriction smaller than the diameter of said ball valve means, said internal portion of said valve member extending into said constriction; and an actuating means for effecting rectilinear movement to said valve member.